United States Patent [19]

Islam

[11] Patent Number: 6,039,800
[45] Date of Patent: Mar. 21, 2000

[54] PRODUCTION OF FOAMED COMPOSITIONS CONTAINING GYPSUM

[75] Inventor: Mojahedul Islam, Powell, Ohio

[73] Assignee: Witco Corporation, Greenwich, Conn.

[21] Appl. No.: 09/078,959

[22] Filed: May 14, 1998

[51] Int. Cl.[7] ............................ C04B 38/10; C04B 24/12; C04B 11/00

[52] U.S. Cl. ........................ 106/680; 106/677; 106/678; 106/778; 106/781; 106/783; 106/820

[58] Field of Search ..................... 106/677, 678, 106/680, 820, 778, 781, 783

[56] References Cited

U.S. PATENT DOCUMENTS

| | | | |
|---|---|---|---|
| 3,926,650 | 12/1975 | Lange et al. | 106/678 |
| 4,249,948 | 2/1981 | Okada et al. | 106/678 |
| 5,679,150 | 10/1997 | Kerkar et al. | 106/808 |
| 5,711,801 | 1/1998 | Chatterji et al. | 106/789 |

FOREIGN PATENT DOCUMENTS

| | | | |
|---|---|---|---|
| 26 05 633 A1 | 9/1976 | Germany . | |
| 50-022022 | 3/1975 | Japan | 106/677 |
| 50-070422 | 6/1975 | Japan | 106/678 |
| 58-140364 | 8/1983 | Japan | 106/677 |

OTHER PUBLICATIONS

Abstract of Japanese Publication No. JP 58 140364 A. (Aug. 1983).
Abstract of Japanese Publication No. JP 11 071146 A. (Mar. 1999).
Abstract of Japanese Publication No. JP 61 286255 A. (Jun. 1985).
Abstract of Japanese Publication No. JP 75 127918 A. (Oct. 1975).
Abstract of Japanese Publication No. JP 07 291762 A. (Nov. 1995).

*Primary Examiner*—Anthony Green
*Attorney, Agent, or Firm*—Scully, Scott, Murphy & Presser

[57] ABSTRACT

Disclosed is a process of making foamed compositions of water, gypsum, and either or both of alpha-olefin sulfonates and/or amphoteric surfactants of formula (a) or (b)

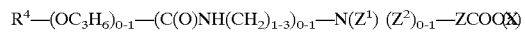

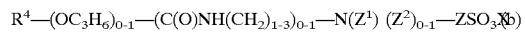

wherein X is —H, a sodium, calcium, potassium, lithium or ammonium cation, or an amine of the formula —$N^+H(C_{1\text{-}20}$ alkyl$)_2$ or —$N^+H_2(C_{1\text{-}20}$ alkyl); or when a $Z^2$ group is present there is no X group on —ZCOOX; $R^4$ is straight or branched alkyl or alkylene, or cyclic or heterocyclic aromatic which is optionally substituted with alkyl, and contains 4 to 40 carbon atoms and 0–5 carbon-carbon double bonds; $Z^1$ and $Z^2$ are independently of each other H, $C_fH_{2f+1}$ or $C_fH_{2f}OH$ wherein f is 1 to 6 and preferably 1, 2 or 3 or, in formula (a), one of $Z^1$ and $Z^2$ can be —ZCOOX, and Z is $(CH_2)_p$, $CH_2CH_2OCH_2CH_2$, or $CH_2CHOHCH_2$. Also disclosed are the products so made.

23 Claims, 1 Drawing Sheet

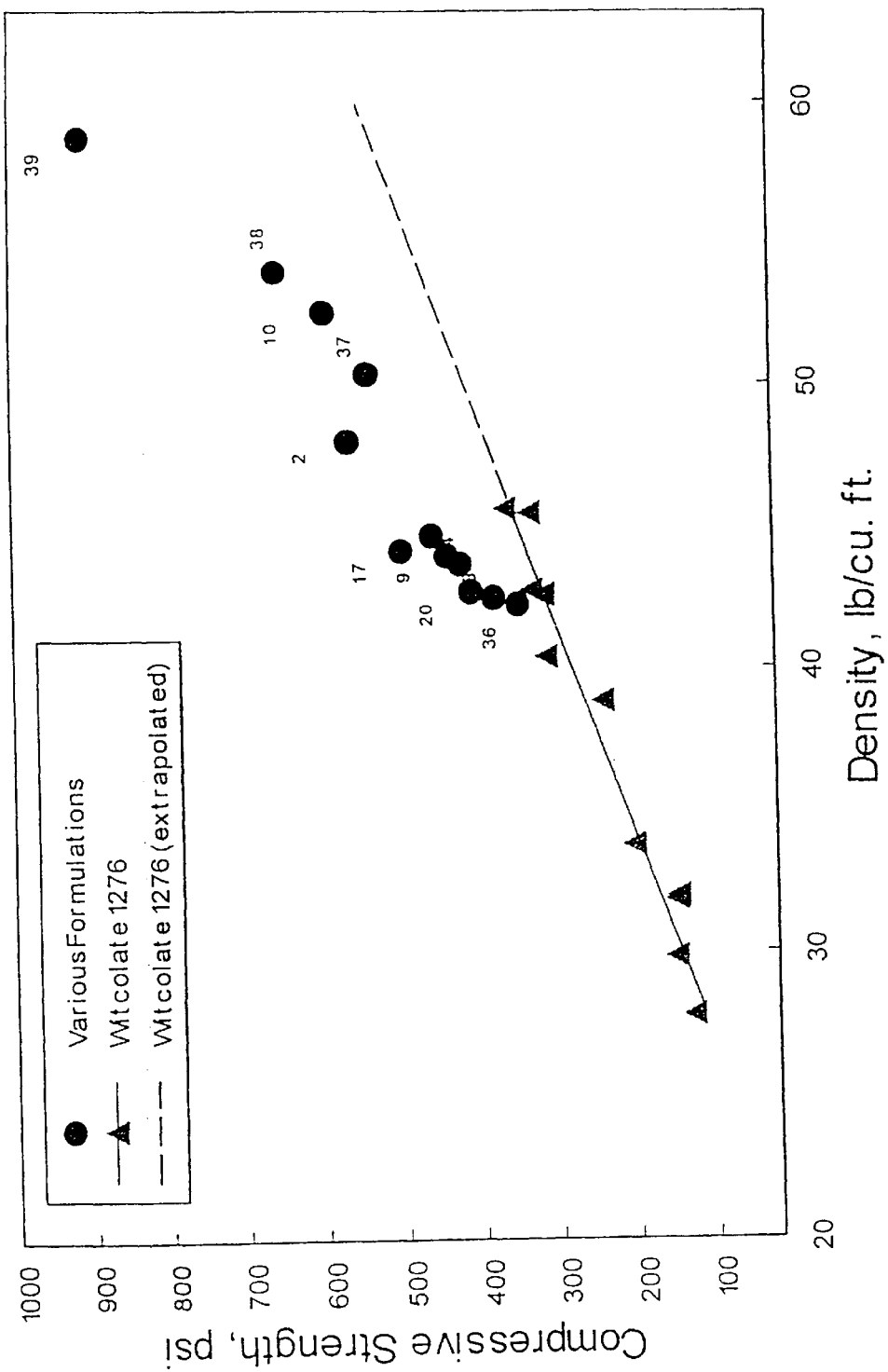

PRODUCTION OF FOAMED COMPOSITIONS CONTAINING GYPSUM

FIELD OF THE INVENTION

The present invention relates to surfactant compositions and their use in forming foamed compositions with gypsum.

BACKGROUND OF THE INVENTION

It is conventional practice in the production of solid gypsum products to employ an aqueous slurry composed predominantly of "calcined" gypsum, which slurry is poured or formed into the desired shape of the final product and is then cured and dried. Calcined gypsum is one term customarily used in this field to denote calcium sulfate hemihydrate, $CaSO_1 \cdot 1/2H_2O$. Aqueous slurries of calcined gypsum are fluid and gradually react with the water in the slurry to form hydrated calcium sulfate, $CaSO_4 \cdot 2H_2O$, which is solid. The aqueous slurry of calcined gypsum conventionally contains functional additives such as accelerators, fibers, colorants, starches, and the like. This slurry also often contains small particles of hydrated calcium sulfate which serve as "seeds", i.e., nucleation sites.

Construction products such as gypsum board are a familiar example of products formed using aqueous slurries of calcined gypsum. The board is typically formed by depositing an aqueous slurry of calcined gypsum and other desired additives onto a horizontal substrate, typically heavy paper, which is destined to be one surface of the finished wall board product, following which a second sheet of heavy paper or the like is placed over the flat slurry to form a sandwich which is subsequently treated to dry and solidify the final wallboard product.

In the production of gypsum board, and in the production of other articles from aqueous slurries of calcined gypsum, it is known to incorporate a surfactant component and to subject the water borne surfactant to foaming, before, during or after combination with the calcined gypsum. In this way, the slurry contains entrained air. Foaming techniques of this type have been found to provide advantages such as reduced consumption of calcined gypsum for a given quantity of final product, and accordingly reduced weight of the final product, while retaining a generally satisfactory level of strength in the final, dried product.

Foaming techniques of this type are disclosed in published patent application WO 95/16515, which discloses foaming agent compositions comprising alkyl sulfate and alkoxylated alkyl sulfates; U.S. Pat. No. 5,466,393, which discloses foaming compositions comprising a glycol species selected from alkylene glycols, alkylene glycol ethers and polyalkylene glycol ethers, mixed together with alkylpolyether sulfates; CA 124:183886q which discloses foaming agents containing polyoxyethylene monoalkylether sulfate ester salts and ethoxylated lower alkanols; and U.S. Pat. No. 5,158,612 which discusses narrow range alkoxylated alcohol sulfonates as well as U.S. Pat. No. 4,168,370 which discusses sodium and ammonium salts of alcohol ether sulfates.

There remains a need for foaming compositions and processes useful in the preparation of foamed gypsum compositions, which afford improved strength, or greater weight reduction, and which employ readily available materials which are easily adaptable to such applications.

BRIEF SUMMARY OF THE INVENTION

One aspect of the present invention is a process for making a foamed gypsum composition, comprising (I) combining water and one or more surfactants selected from the group consisting of sodium, ammonium and amine-neutralized alpha-olefin sulfonates, and amphoteric surfactants of formula (a) or (b)

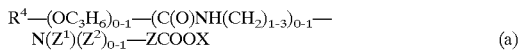
$$R^4-(OC_3H_6)_{0-1}-(C(O)NH(CH_2)_{1-3})_{0-1}-N(Z^1)(Z^2)_{0-1}-ZCOOX \quad (a)$$

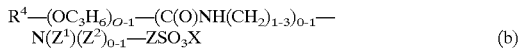
$$R^4-(OC_3H_6)_{O-1}-(C(O)NH(CH_2)_{1-3})_{0-1}-N(Z^1)(Z^2)_{0-1}-ZSO_3X \quad (b)$$

wherein X is —H, a sodium, calcium, potassium, lithium or ammonium cation, or an amine of the formula —N$^+$H(C$_{1-20}$ alkyl), or —N$^+$H$_2$(C$_{1-20}$ alkyl); or when a $Z^2$ group is present there is no X group on —ZCOOX; $R^4$ is straight or branched alkyl or alkylene, or cyclic or heterocyclic aromatic which is optionally substituted with alkyl, and contains 4 to 40 carbon atoms and 0–5 carbon-carbon double bonds; $Z^1$ and $Z^2$ are independently of each other H, $C_fH_{2f+1}$ or $C_fH_{2f}OH$ wherein f is 1 to 6 and preferably 1, 2 or 3 or, in formula (a), one of $Z^1$ and $Z^2$ can be —ZCOOX, and Z is $(CH_2)_f$, $CH_2CH_2OCH_2CH_2$, or $CH_2C(OH)HCH_2$; and (II) foaming the resulting combination, provided that (A) the water in step (I) contains calcined gypsum slurried therein, and said foaming is carried out during or after said combining thereof with said one or more surfactants, or (B) said process during or after step (II) further comprises (III) combining the product of step (II) and an aqueous slurry of calcined gypsum.

Additional aspects of the present invention include fluid, foamed compositions which are produced by the aforementioned process, and solid gypsum articles produced by carrying out the aforementioned process and then allowing the resultant fluid, foamed composition to cure and solidify.

BRIEF DESCRIPTION OF THE DRAWING

FIG. 1 is a graph of compressive strength versus density of foamed gypsum cubes made using different surfactants.

DETAILED DESCRIPTION OF THE INVENTION

The α-olefin sulfonates comprise one or a fixture of compounds of the formulas (1a) and/or (Ib)

$$(R^1CH(OH)-(CH_2)_mSO_3)_iX \quad (Ia)$$

$$(R^1CH=CH(CH_2)_{m-1}SO_3)_iX \quad (Ib)$$

and mixtures thereof, wherein $R^1$ contains 6 to 40 carbon atoms and is straight or branched aliphatic, aromatic, alkyl-aromatic, aromatic-alkyl, or alkyl-aromatic-alkyl, m is 1–10, X is as defined above, and i is 1 or more and is the valence of X.

Preferred $R^1$ groups include straight and branched alkyl groups containing 9–25, and preferably 15–17, carbon atoms. Preferred $R^1$ groups containing an aromatic moiety include these wherein the aromatic moiety is phenyl. Other aromatic moieties include naphthalene, indanyl and indenyl. Examples of groups with an aromatic moiety include phenyl, alkyl-substituted phenyl, benzyl and alkyl-substituted benzyl. In formulas (Ia) and (Ib), m is 1–10 and preferably 2–4.

Preferred compounds include those known generically as olefin sulfonates, which are mixtures of long chain sulfonate salts prepared by sulfonation of long chain olefins. Because of the nature of the sulfonation process, the olefin sulfonates generally comprise mixtures of alkene sulfonates and hydroxy alkane sulfonates. Particularly preferred olefin sulfonates include, but are not limited to, alpha-olefin sulfonates.

Preferred examples of these olefin sulfonates useful in the present invention are those sold by Witco Corporation under the name "Witconate AOS", and "Witconate AOS-12".

The amphoteric surfactant useful in the present invention comprises one or more amphoteric compounds which correspond to either of formulas (a) and (b). Formulas (a) and (b) embrace betaines, iminopropionates, glycinates, propionates, sultaines (sulfobetaines) and hydroxysultaines, all of which are commercially available and/or can readily be synthesized.

Preferred amphoteric surfactants of formula (a) or (b) are those having one of the following formulas:

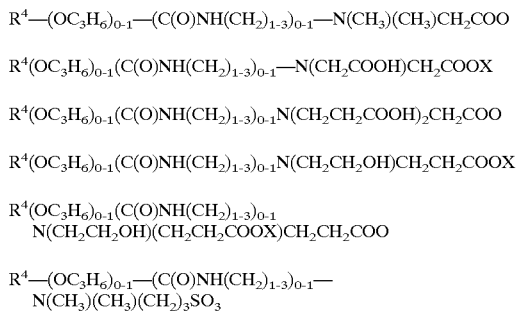

or

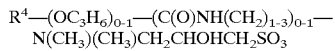

wherein X is —H, a sodium, calcium, potassium, lithium or ammonium cation, or an amine of the formula —$N^+H(C_{1-20}$ alkyl$)_2$ or —$N^+H_2(C_{1-20}$ alkyl); and $R^4$ is straight or branched alkyl or alkylene, or cyclic or heterocyclic aromatic which is optionally substituted with alkyl, and contains 4 to 40 carbon atoms and 0–5 carbon-carbon double bonds.

Examples of preferred amphoteric surfactants include fatty betaines such as cocamidopropyl betaine (e.g. REWOTERIC® AM B-14) and N-lauryl-beta-iminopropionic acid, mono-sodium salt (e.g. REWOTERIC® AM-LP); glycinates such as N-cocoylamidoethyl-N-(2-hydroxyethyl)-N-carboxymethyl glycine, disodium salt (e.g. REWOTERIC® AM-2C-W) and the N-lauroyl analog thereof (e.g. REWOTERIC®-AM-2L); propionates such as sodium cocoamphopropionate (e.g. REWOTERIC® AM-KSF-40); and sulfobetaines such as lauryl hydroxy sultaine (e.g. REWOTERIC® AM-HC) and cocamidopropyl hydroxysultaine (e.g. REWOTERIC® AM-CAS).

Thus, a preferred Z group in formula (a) is either —$CH_2$— or —$CH_2CH_2$— and in formula (b) a preferred Z group is —$CH_2C(OH)HCH_2$—. Preferred compounds include those wherein one or both of $Z^1$ and $Z^2$ are —$CH_3$; or $Z^1$ is —$CH_2COONa$ or —$CH_2CH_2OH$ or $CH_2CH_2COONa$, and $Z^2$ when present is —$CH_2CH_2OH$.

Preferred $R^4$ groups include alkyl and alkylene radicals derived from fatty acids. Other preferred $R^4$ groups include benzyl, and alkyl-substituted benzyl, $R^4$ can contain 4 to 40 carbon atoms, preferably 6 to 22 carbon atoms and more preferably 6 to 18 carbon atoms.

Preferred surfactants include the following:

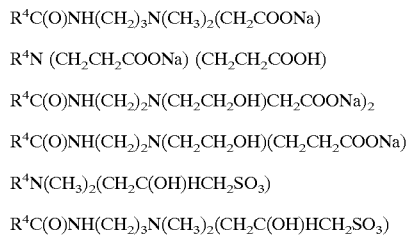

The surfactant compositions useful in this invention include combinations of α-olefin sulfonate and amphoteric surfactants, may contain amphoteric surfactant without α-olefin sulfonate, and may contain α-olefin sulfonate without amphoteric surfactant. As will be seen hereinbelow, for best results the choice of surfactants and the appropriateness of using one type or a mixture of both types, is influenced by the choice of technique by which the desired foamed composition is prepared.

In the final composition formed in accordance with the process of this invention, including the water and calcined gypsum, the total amount of any α-olefin sulfonate and amphoteric surfactant present should comprise 0.001 wt. % to 0.5 wt. % of the total weight of the foamed composition, including surfactant, water, and gypsum. Preferably, the combined amount of such surfactants present is in the preferred range of 0.005 wt. % to 0.1 wt. % of the total composition. Even more preferred are amounts of from 0.01 to 0.06 wt. %.

In the foamed composition, the gypsum component typically comprises 30 to 70 wt. % of the total amount of material present, including the water, and preferably comprises 40 wt. % to 60 wt. % of the total material present.

On occasion, the combination of amphoteric surfactant addition to α-olefin sulfonate can lead to formation of a gel. This result is very undesirable in the production of gypsum articles. The tendency of any particular addition of given quantities of given materials to form a gel can readily be determined by a separate experiment, before incorporation into the production of the desired foamed compositions. If formation of such a gel is observed, the tendency to gel formation can be avoided by addition of a hydrotrope in addition to the amphoteric surfactant and α-olefin sulfonate. Among the useful hydrotropes for this purpose are isopropanol, ethanol, methanol, ethylene glycol, propylene glycol, polyethylene and polypropylene glycols, monoalkyl ethers of ethylene glycol, alkyl polyglucosides, and the like, and mixtures thereof.

One useful technique, which is the preferred technique, for producing foamed compositions in accordance with the present invention is combining the surfactant component and water, and then foaming this mixture, and then combining this foamed mixture with an aqueous slurry of calcined gypsum. The aqueous mixture of water and surfactant typically contains 0.05 wt. % to 1.0 wt. % of the surfactant component.

The amount of water mixed with the calcined gypsum typically ranges from 0.3 to 1.5 grams of water per gram of calcined gypsum, and preferably 0.5 to 0.9 grams water/gram calcined gypsum.

Foaming can be carried out in any of the typically practiced techniques to obtain rapid entrainment of air into the mixture, such as bubbling air into the mixture and/or mechanical agitation, or even mechanically induced shearing with forced injection of air.

Other embodiments which achieve the same product can also be practiced and are within the present invention. One example is a variation of the above preferred technique, wherein foaming is carried out during the combination of the surfactant/water mixture with the aqueous slurry of calcined gypsum.

Another embodiment is combining the surfactant component directly with an aqueous slurry of calcined gypsum, and foaming the resultant mixture after it is formed or during its formation.

After the foamed composition of calcined gypsum is formed, as described herein or otherwise, the resultant product is a fluid which can be poured or placed into any desired mold or form which is the shape of the eventual desired solid article. Then the fluid is permitted to cure (set) into a solid article; that is, the calcined gypsum is hydrated to gypsum and excess water is removed by evaporation. By "solid" is meant that the article has solidified regardless of the presence of entrained air bubbles and/or water in the solidified article.

The foams produced by these embodiments exhibit satisfactory volume and stability. In addition, the solid articles which are produced by curing and drying the foamed compositions exhibit satisfactory and improved strength for a given density. Furthermore, the process of the present invention entrains air into the foamed compositions in a manner providing a relatively more uniform bubble size distribution. This is a useful feature in that it promotes the strength and the uniformity of the properties of the finished product.

This invention can be used for thick structures such as statuary and blocks, but is particularly useful for thin structures less than 2 inches thick, and preferably 1 inch or less in thickness such as wall panels.

The present invention is illustrated in the following examples, which are provided for purposes of illustration and are not intended to be limiting of that which is considered to be the invention.

EXAMPLE 1

Gypsum Cube Preparation and Compressive Strength Testing

The calcined gypsum used in this study was #1 Molding Plaster, from Hamilton Parker, Columbus, Ohio. A seeding agent, also known as accelerator, was prepared in the lab by mixing the above calcined gypsum with water and allowing the slurry to set. The set gypsum which was the result of this step was then dried and ground to a fine powder (99% through 400 mesh) using a Bico pulverizer. This ground gypsum was used as the seeding agent. Various foaming agents were tested and are listed in Table 2 below.

Procedure 870 grams of calcined gypsum was weighed into the bowl of a kitchen mixer (Kitchen Aid Model KSM90) and 5.22 grams of seeding agent was added. The dry mix was then thoroughly mixed using the mixer. 155.6 grams of tap water was weighed into a separate high-speed blender. 300 microliters of the surfactant mixture was added and this mixture was then mixed at 7000 rpm to generate foam. It is important to mix long enough to convert all of the liquid to foam. Mixing for 1 to 5 minutes is normally adequate. While the foam was being generated, 537 grams of tap water was weighed into a cylinder. After foam generation, the weighed water was added to the dry solids in the mixer, and was allowed to soak for 10 seconds. The slurry, containing predominantly calcined gypsum, was then mixed at medium speed for 5 seconds, followed by gentle mixing for 10 seconds using a spatula, to ensure all the dry ingredients were wetted. The foam was then quickly added to the slurry, and then it was mixed at the highest speed for 10 seconds. The resultant slurry was then poured into six cubic molds (2 inch×2 inch×2 inch). Excess slurry on top of the molds was scraped off using a flat spatula, thus leveling the slurry surface with the mold surface. After 20 minutes of set time, the cubes were removed from the molds and weighed. The cubes were then placed inside a closed container for at least an hour to ensure complete hydration of the calcined gypsum to gypsum. The cubes were then dried in an oven (temp=40° C.) until the cubes ceased to lose weight. The drying process normally took 48 to 72 hours depending on the number of samples in the oven.

Twenty-four hours prior to compressive strength testing, the cubes were weighed and placed inside a closed box at room temperature and 45–50% relative humidity. Compressive strengths were measured using a "TINIUS OLSEN" model #53035, tensile/compressive strength tester. The head speed of the instrument used was 0.06 inches/min. for all tests carried out. The data in Table 2 are the averages of the measurements of all the cubes from each formulation.

Cubes of different densities of a given surfactant blend were made by varying the speed of the foam generator, thus generating foams of different volumes. Amounts of ingredients were also varied, but the ratio of calcined gypsum to total liquid was kept constant for all studies. Table 1 lists amounts of individual ingredients. Table 2 lists the specific formulations and the resulting density and compressive strengths of the gypsum cubes. Table 3 lists results obtained similarly using as the surfactant "Witcolate 12761" which is an ether sulfate representative of the existing commercial surfactants used for this purpose. The data are summarized in FIG. 1 which shows the improved compressive strength of foamed gypsum made according to this invention compared to foamed gypsum made using conventional ether sulfates.

TABLE 1

Amounts of Calcined Gypsum, Accelerator, Surfactant and Water used in Gypsum Cube Preparation

| Slurry | | | Diluted Surfactant Mixture | |
|---|---|---|---|---|
| Calcined Gypsum, grams | Accelerator, grams | Water, grams | Surfactant, microliters | Water, grams |
| 870 | 5.22 | 537 | 300 | 155.6 |
| 870 | 5.22 | 592.6 | 300 | 100 |
| 435 | 2.61 | 246 | 300 | 100 |
| 435 | 2.61 | 246 | 150 | 100 |

TABLE 2

Various Formulations of Gypsum and Foamer and the
Resulting Density and Compressive Strength Data of
Gypsum Cubes

| | Surfactant Components, in grams, added to 4.4 grams of water and 3.1 grams of isopropanol | | | | | | Properties of Foamed Gypsum Cubes | |
|---|---|---|---|---|---|---|---|---|
| Sample | Wiconate AOS | Rewoteric AMB-14V | Rewoteric AM-CAS-15U | Rewoteric AM LP | Witconate AOS 12 | Witconate 3203 | Density lb/cu. ft | Compressive Strength, psi |
| 3 | 25 | 0 | 0 | 0 | 0 | 0 | 44.18 | 442 |
| 21 | 18.75 | 6.25 | 0 | 0 | 0 | 0 | 44.42 | 474 |
| 9 | 12.5 | 12.5 | 0 | 0 | 0 | 0 | 44.00 | 440 |
| 22 | 6.25 | 18.75 | 0 | 0 | 0 | 0 | 44.93 | 476 |
| 4 | 0 | 25 | 0 | 0 | 0 | 0 | 43.70 | 423 |
| 3 | 25 | 0 | 0 | 0 | 0 | 0 | 44.18 | 442 |
| 23 | 18.75 | 0 | 6.25 | 0 | 0 | 0 | 43.29 | 430 |
| 8 | 12.5 | 0 | 12.5 | 0 | 0 | 0 | 42.71 | 388 |
| 8 | 12.5 | 0 | 12.5 | 0 | 0 | 0 | 42.50 | 380 |
| 24 | 6.25 | 0 | 18.75 | 0 | 0 | 0 | 43.97 | 415 |
| 1 | 0 | 0 | 25 | 0 | 0 | 0 | 44.18 | 393 |
| 3 | 25 | 0 | 0 | 0 | 0 | 0 | 44.18 | 442 |
| 25 | 18.75 | 0 | 0 | 6.25 | 0 | 0 | 46.28 | 556 |
| 18 | 12.5 | 0 | 0 | 12.5 | 0 | 0 | 46.76 | 629 |
| 18 | 12.5 | 0 | 0 | 12.5 | 0 | 0 | 46.17 | 558 |
| 26 | 6.25 | 0 | 0 | 18.75 | 0 | 0 | 49.71 | 610 |
| 2 | 0 | 0 | 0 | 25 | 0 | 0 | 48.06 | 565 |
| 4 | 0 | 25 | 0 | 0 | 0 | 0 | 43.70 | 423 |
| 27 | 0 | 18.75 | 6.25 | 0 | 0 | 0 | 45.59 | 469 |
| 6 | 0 | 12.5 | 12.5 | 0 | 0 | 0 | 43.80 | 400 |
| 6 | 0 | 12.5 | 12.5 | 0 | 0 | 0 | 44.71 | 459 |
| 28 | 0 | 6.25 | 18.75 | 0 | 0 | 0 | 46.16 | 473 |
| 1 | 0 | 0 | 25 | 0 | 0 | 0 | 44.18 | 393 |
| 4 | 0 | 25 | 0 | 0 | 0 | 0 | 43.70 | 423 |
| 29 | 0 | 18.75 | 0 | 6.25 | 0 | 0 | 45.70 | 474 |
| 7 | 0 | 12.5 | 0 | 12.5 | 0 | 0 | 43.54 | 440 |
| 30 | 0 | 6.25 | 0 | 18.75 | 0 | 0 | 45.S0 | 547 |
| 2 | 0 | 0 | 0 | 25 | 0 | 0 | 48.06 | 565 |
| 1 | 0 | 0 | 25 | 0 | 0 | 0 | 44.18 | 393 |
| 31 | 0 | 0 | 18.75 | 6.25 | 0 | 0 | 45.69 | 488 |
| 19 | 0 | 0 | 12.5 | 12.5 | 0 | 0 | 44.41 | 490 |
| 32 | 0 | 0 | 6.25 | 18.75 | 0 | 0 | 46.98 | 504 |
| 2 | 0 | 0 | 0 | 25 | 0 | 0 | 48.06 | 565 |
| 33 | 0 | 0 | 0 | 0 | 25 | 0 | 48.08 | 445 |
| 34 | 12.5 | 0 | 0 | 0 | 12.5 | 0 | 43.82 | 388 |
| 35 | 0 | 12.5 | 0 | 0 | 12.5 | 0 | 44.03 | 395 |
| 36 | 0 | 0 | 12.5 | 0 | 12.5 | 0 | 42.26 | 348 |
| 37 | 0 | 0 | 0 | 12.5 | 12.5 | 0 | 50.42 | 540 |
| 38 | 0 | 0 | 0 | 0 | 12.5 | 12.5 | 54.07 | 654 |
| 39 | 0 | 0 | 0 | 0 | 0 | 25 | 58.84 | 910 |
| 14 | 6.25 | 0 | 0 | 0 | 0 | 18.75 | 44.68 | 460 |
| 15 | 0 | 6.25 | 0 | 0 | 0 | 18.75 | 45.24 | 513 |
| 5 | 0 | 0 | 6.25 | 0 | 0 | 18.75 | 42.72 | 372 |
| 16 | 0 | 0 | 0 | 6.25 | 0 | 18.75 | 54.00 | 602 |
| 11 | 15.62 | 0 | 0 | 0 | 0 | 9.38 | 43.84 | 437 |
| 12 | 0 | 15.62 | 0 | 0 | 0 | 9.38 | 44.46 | 468 |
| 13 | 0 | 0 | 15.62 | | 0 | 9.38 | 42.53 | 328 |
| 10 | 0 | 0 | 0 | 15.62 | 0 | 9.38 | 52.61 | 593 |
| 10 | 0 | 0 | 0 | 15.62 | 0 | 9.38 | 53.28 | 562 |
| 20 | 5.21 | 5.21 | 5.21 | 0 | 0 | 9.38 | 43.82 | 475 |
| 20 | 5.21 | 5.21 | 5.21 | 0 | 0 | 9.38 | 42.71 | 410 |
| 17 | 3.91 | 3.91 | 3.91 | 3.91 | 0 | 9.36 | 44.18 | 499 |
| 17 | 3.91 | 3.91 | 3.91 | 3.91 | 0 | 9.36 | 43.04 | 445 |

TABLE 3

Density and Compressive Strength of Gypsum
Cubes Made Using Witcolate 1276 (Ammonium Lauryl Ether Sulfate)

| Density, lbs./cu. ft. | Compressive strength, psi |
|---|---|
| 27.77 | 129 |
| 29.81 | 151 |
| 31.83 | 149 |
| 31.96 | 147 |
| 33.78 | 203 |
| 38.84 | 241 |
| 40.40 | 313 |
| 42.60 | 315 |
| 42.75 | 330 |
| 45.49 | 332 |
| 45.65 | 364 |

What is claimed is:

1. A process for making a foamed gypsum composition, comprising:
   (I) combining water and one or more surfactants selected from the group consisting of amphoteric surfactants of formula (a) or (b)

$$R^4-(OC_3H_6)_x-(C(O)NH(CH_2)_{1-3})_y-N(Z^1)(Z^2)_{0-1}-ZCOOX \quad (a)$$
   $$R^4-(OC_3H_6)_x-(C(O)NH(CH_2)_{1-3})_y-N(Z^1)(Z^2)_{0-1}ZSO_3X \quad (b)$$

wherein
   X is —H, a sodium, calcium, potassium, lithium or ammonium cation, or an amine of the formula —N$^+$H(C$_{1-20}$ alkyl)$_2$ or N$^+$H$_2$ (C$_{1-20}$ alkyl); or when a Z$^2$ group is present there is no X group on —ZCOOX;
   R$^4$ is straight or branched alkyl or alkylene, or cyclic or heterocyclic aromatic which is optionally substituted with alkyl, and contains 4 to 40 carbon atoms and 0–5 carbon-carbon double bonds;
   x is 0–1, y is 0–1, and x+y is 0–1;
   Z$^1$ and Z$^2$ are independently of each other H, C$_f$H$_{2f+1}$, or C$_f$H$_{2f}$OH wherein f is 1 to 6 or, in formula (a), one of Z$^1$ and Z$^2$ may further be —ZCOOX, where Z is (CH$_2$)$_f$, CH$_2$CH$_2$OCH$_2$CH$_2$ or CH$_2$CHOHCH$_2$; and
   (II) foaming the resulting combination, provided that either:
   (A) the water in step (I) contains calcined gypsum slurried therein, and step II is carried out during or after step (I), or
   (B) the process during or after step (II) further comprises an additional step (III) of combining the product of step (II) and an aqueous slurry of calcined gypsum.

2. The process according to claim 1, wherein step (I) comprises combining an aqueous slurry of calcined gypsum and the one or more surfactants, and wherein step II is carried out during step (I).

3. The process according to claim 1, wherein step (I) comprises combining an aqueous slurry of calcined gypsum and the one or more surfactants, and wherein step (II) is carried out after step (I).

4. The process according to claim 1, further comprising, after step (II), additional step (III) combining the combination formed in step (II) with an aqueous slurry of calcined gypsum.

5. A process according to claim 1, further comprising, during step (II), additional step (III) combining the combination formed in step (II) with an aqueous slurry of calcined gypsum.

6. The process according to claim 1, wherein the one or more surfactants is selected from the group consisting of compounds of the formula $$R^4-(OC_3H_6)_{0-1}-(C(O)NH(CH_2)_{1-3})_{0-1}-N(CH_3)(CH_3)CH_2COO$$

wherein R$^4$ is straight or branched alkyl or alkylene, or cyclic or heterocyclic aromatic which is optionally substituted with alkyl, and contains 4 to 40 carbon atoms and 0–5 carbon-carbon double bonds.

7. The process according to claim 1, wherein the one or more surfactants is selected from the group consisting of compounds of the formula $$R^4-(OC_3H_6)_{0-1}-(C(O)NH(CH_2)_{1-3})_{0-1}-N(CH_2COOH)CH_2COOX$$

wherein X is —H, a sodium, calcium, potassium, lithium or ammonium cation, or an amine of the formula —N$^+$H(C$_{1-20}$ alkyl)$_2$ or —N$^+$H$_2$(C$_{1-20}$ alkyl); and R$^4$ is straight or branched alkyl or alkylene, or cyclic or heterocyclic aromatic which is optionally substituted with alkyl, and contains 4 to 40 carbon atoms and 0–5 carbon-carbon double bonds.

8. The process according to claim 1, wherein the one or more surfactants is selected from the group consisting of compounds of the formula $$R^4(OC_3H_6)_{0-1}(C(O)NH(CH_2)_{1-3})_{0-1}-N(CH_2CH_2COOH)_2CH_2COO$$

wherein R$^4$ is straight or branched alkyl or alkylene, or cyclic or heterocyclic aromatic which is optionally substituted with alkyl, and contains 4 to 40 carbon atoms and 0–5 carbon-carbon double bonds.

9. The process according to claim 1, wherein the one or more surfactants is selected from the group consisting of compounds of the formula $$R^4(OC_3H_6)_{0-1}(C(O)NH(CH_2)_{1-3})_{0-1}N(CH_2CH_2OH)CH_2CH_2COOX$$

and $$R^4(OC_3H_6)_{0-1}(C(O)NH(CH_2)_{1-3})_{0-1}N(CH_2CH_2OH)(CH_2CH_2COOX)CH_2CH_2COO$$

wherein X is —H, a sodium, calcium, potassium, lithium or ammonium cation, or an amine of the formula —N$^+$H(C$_{1-20}$ alkyl)$_2$ or —N$^+$H$_2$(C$_{1-20}$ alkyl); and R$^4$ is straight or branched alkyl or alkylene, or cyclic or heterocyclic aromatic which is optionally substituted with alkyl, and contains 4 to 40 carbon atoms and 0–5 carbon-carbon double bonds.

10. The process according to claim 1, wherein the one or more surfactants is selected from the group consisting of compounds of the formula $$R^4-(OC_3H_6)_{0-1}-(C(O)NH(CH_2)_{1-3})_{0-1}-N(CH_2)(CH_3)(CH_2)_3SO_3$$

wherein R$^4$ is straight or branched alkyl or alkylene, or cyclic or heterocyclic aromatic which is optionally substituted with alkyl, and contains 4 to 40 carbon atoms and 0–5 carbon-carbon double bonds.

11. The process according to claim 1, wherein the one or more surfactants is selected from the group consisting of compounds of the formula $$R^4-(OC_3H_6)_{0-1}-(C(O)NH(CH_2)_{1-3})_{0-1}-N(CH_3)(CH_3)CH_2CHOHCH_2SO_3$$

wherein R$^4$ is straight or branched alkyl or alkylene, or cyclic or heterocyclic aromatic which is optionally substituted with alkyl, and contains 4 to 40 carbon atoms and 0–5 carbon-carbon double bonds.

12. A fluid composition prepared by a process which comprises (I) combining water and one or more surfactants selected from the group consisting of amphoteric surfactants of formula (a) or (b)

$$R^4\text{—}(OC_3H_6)_x\text{—}(C(O)NH(CH_2)_{1\text{-}3})_y\text{—}N(Z^1)(Z^2)_{0\text{-}1}ZCOOX \quad (a)$$

$$R^4\text{—}(OC_3H_6)_x\text{—}(C(O)NH(CH_2)_{1\text{-}3})_y\text{—}N(Z^1)(Z^2)_{0\text{-}1}ZSO_3X \quad (b)$$

wherein

X is —H, a sodium, calcium, potassium, lithium or ammonium cation, or an amine of the formula —N⁺H($C_{1\text{-}20}$ alkyl)$_2$ or N⁺H$_2$($C_{1\text{-}20}$ alkyl); or when a $Z^2$ group is present there is no X group on —ZCOOX;

$R^4$ is straight or branched alkyl or alkylene, or cyclic or heterocyclic aromatic which is optionally substituted with alkyl, and contains 4 to 40 carbon atoms and 0–5 carbon-carbon double bonds;

x is 0–1, y is 0–1, and x+y is 0–1;

$Z^1$ and $Z^2$ are independently of each other H, $C_fH_{2f+1}$, or $C_fH_{2f}OH$ wherein f is 1 to 6 or, in formula (a), one of $Z^1$ and $Z^2$ may further be —ZCOOX, where Z is $(CH_2)_f$, $CH_2CH_2OCH_2CH_2$ or $CH_2CHOHCH_2$; and (II) foaming the resulting combination, provided that either:
(A) the water in step (I) contains calcined gypsum slurried therein, and step II is carried out during or after step (I), or
(B) the process during or after step (II) further comprises an additional step (III) of combining the product of step (II) and an aqueous slurry of calcined gypsum.

13. The composition according to claim 12, wherein step (I) comprises combining an aqueous slurry of calcined gypsum and the one or more surfactants, and wherein step II is carried out during step (I).

14. The composition according to claim 12, wherein step (I) comprises combining an aqueous slurry of calcined gypsum and the one or more surfactants, and wherein step (II) is carried out after step (I).

15. The composition according to claim 12, wherein the process further comprises, after step (II), additional step (III) combining the combination formed in step (II) with an aqueous slurry of calcined gypsum.

16. The composition according to claim 12, wherein the process further comprises, during step (II), additional step (III) combining the combination formed in step (II) with an aqueous slurry of calcined gypsum.

17. The composition according to claim 12, wherein the one or more surfactants is selected from the group consisting of compounds of the formula $$R^4\text{—}(OC_3H_6)_{0\text{-}1}\text{—}(C(O)NH(CH_2)_{1\text{-}3})_{0\text{-}1}\text{—}N(CH_3)(CH_3)CH_2COO$$

wherein $R^4$ is straight or branched alkyl or alkylene, or cyclic or heterocyclic aromatic which is optionally substituted with alkyl, and contains 4 to 40 carbon atoms and 0–5 carbon-carbon double bonds.

18. The composition according to claim 12, wherein the one or more surfactants is selected from the group consisting of compounds of the formula $$R^4\text{—}(OC_3H_6)_{0\text{-}1}\text{—}(C(O)NH(CH_2)_{1\text{-}3})_{0\text{-}1}\text{—}$$
$$N(CH_2COOH)CH_2COOX$$

wherein X is —H, a sodium, calcium, potassium, lithium or ammonium cation, or an amine of the formula —N⁺H($C_{1\text{-}20}$ alkyl)$_2$ or —N⁺H$_2$($C_{1\text{-}20}$ alkyl); and $R^4$ is straight or branched alkyl or alkylene, or cyclic or heterocyclic aromatic which is optionally substituted with alkyl, and contains 4 to 40 carbon atoms and 0–5 carbon-carbon double bonds.

19. The composition according to claim 12, wherein the one or more surfactants is selected from the group consisting of compounds of the formula $$R^4(OC_3H_6)_{0\text{-}1}(C(O)NH(CH_2)_{1\text{-}3})_{0\text{-}1}\text{—}$$
$$N(CH_2CH_2COOH)_2CH_2COO$$

wherein $R^4$ is straight or branched alkyl or alkylene, or cyclic or heterocyclic aromatic which is optionally substituted with alkyl, and contains 4 to 40 carbon atoms and 0–5 carbon-carbon double bonds.

20. The composition according to claim 12, wherein the one or more surfactants is selected from the group consisting of compounds of the formula $$R^4(OC_3H_6)_{0\text{-}1}(C(O)NH(CH_2)_{1\text{-}3})_{0\text{-}1}N(CH_2CH_2OH)CH_2CH_2COOX$$

and $$R^4(OC_3H_6)_{0\text{-}1}(C(O)NH(CH_2)_{1\text{-}3})_{0\text{-}1}$$
$$N(CH_2CH_2OH)(CH_2CH_2COOX)CH_2CH_2COO$$

wherein X is —H, a sodium, calcium, potassium, lithium or ammonium cation, or an amine of the formula —N⁺H($C_{1\text{-}20}$ alkyl)$_2$ or —N⁺H$_2$($C_{1\text{-}20}$ alkyl); and $R^4$ is straight or branched alkyl or alkylene, or cyclic or heterocyclic aromatic which is optionally substituted with alkyl, and contains 4 to 40 carbon atoms and 0–5 carbon-carbon double bonds.

21. The composition according to claim 12, wherein the one or more surfactants is selected from the group consisting of compounds of the formula $$R^4\text{—}(OC_3H_6)_{0\text{-}1}\text{—}(C(O)NH(CH_2)_{1\text{-}3})_{0\text{-}1}\text{—}$$
$$N(CH_3)(CH_3)(CH_2)_3SO_3$$

wherein $R^4$ is straight or branched alkyl or alkylene, or cyclic or heterocyclic aromatic which is optionally substituted with alkyl, and contains 4 to 40 carbon atoms and 0–5 carbon-carbon double bonds.

22. The composition according to claim 12, wherein the one or more surfactants is selected from the group consisting of compounds of the formula $$R^4\text{—}(OC_3H_6)_{0\text{-}1}\text{—}(C(L)NH(CH_2)_{1\text{-}3})_{0\text{-}1}\text{—}$$
$$N(CH_3)(CH_3)CH_2CHOHCH_2SO_3$$

wherein $R^4$ is straight or branched alkyl or alkylene, or cyclic or heterocyclic aromatic which is optionally substituted with alkyl, and contains 4 to 40 carbon atoms and 0–5 carbon-carbon double bonds.

23. A solid article prepared by solidifying a fluid gypsum composition obtained by the process of claim 1.

* * * * *